United States Patent

[11] 3,572,606

[72] Inventor Kozo Yamamoto
Hirakata-shi, Japan

[21] Appl. No. 708,284
[22] Filed Feb. 26, 1968
[45] Patented Mar. 30, 1971

[73] Assignee Matsushita Electric Industrial Co., Ltd.
Osaka, Japan

[54] DEVICE FOR CONTROLLING TAPE DRIVE IN TAPE RECORDER OF MAGAZINE TYPE
4 Claims, 6 Drawing Figs.

[52] U.S. Cl. .................... 242/190, 242/57, 242/199
[51] Int. Cl. .................... B65h 59/38, B65h 63/00
[50] Field of Search .................... 242/55.13, 57, 71.2, 55.12, 197, 198, 199, 200, 189, 190, 186, 191; 274/4, 11

[56] References Cited
UNITED STATES PATENTS

| | | | |
|---|---|---|---|
| 2,894,700 | 7/1959 | Roberts et al. | 242/55.13 |
| 3,111,281 | 11/1963 | Sinkewitsch | 242/55.13 |
| 3,411,730 | 11/1968 | Kelley | 242/57X |

*Primary Examiner*—George F. Mautz
*Attorney*—Stevens, Davis, Miller & Mosher

ABSTRACT: A magazine having means for effecting the drive control for a magnetic tape contained therein. The drive control means is actuated by the tension imparted to the tape at the end of tape supply thereby to stop the movement of or reverse the travelling direction of the tape in cooperation with an associated means.

INVENTOR
KOZO YAMAMOTO

BY Stevens, Davis, Miller & Mosher

ATTORNEYS

DEVICE FOR CONTROLLING TAPE DRIVE IN TAPE RECORDER OF MAGAZINE TYPE

BACKGROUND THE INVENTION

This invention relates to devices for controlling the tape drive in tape recorders of the magazine type.

In connection with tape recorders of the magazine type, a variety of devices for controlling the tape drive in such tape recorders have been proposed hitherto. In one form of the known devices of this kind, a lever is arranged to protrude from the hub of a reel when the tape layers wound around the reel hub have completely run out so that the above movement of the lever can actuate means for stopping the travelling movement of or reversing the travelling direction of the tape. However, conventional tape drive control devices including that described above have been quite complex in structure and have not been so practical in operation.

SUMMARY OF THE INVENTION

It is therefore an object of the present invention to provide a useful device for controlling the tape drive in a tape recorder of the magazine type, in which the rotary movement of the casing of the magazine or the translational movement of the hubs relative to the casing of the magazine is utilized to automatically bring the tape recorder to a halt.

Another object of the present invention is to provide a tape drive control device of the kind described above in which the rotary movement of the casing of the magazine through a definite angle takes place in response to the complete uncoiling of a tape to its trailing end thereby automatically actuating a tape drive control mechanism such as means for stopping the travelling movement of or reversing the travelling direction of the tape. This arrangement eliminates application of any load to the tape drive section except in the case in which the tape is completely uncoiled to the trailing end thereof, thus minimizing the useless consumption of electrical power, and the freedom from any oscillations and vibrations can reduce undesirable mechanical noises to a minimum.

A further object of the present invention is to provide a novel mechanism which acquires the energy required for the tape stopping or reversing operation when the trailing end of a tape is exposed at the end of the tape travel, thereby actuating a switch means associated therewith.

In accordance with the present invention, there is utterly no need of affixing any special device to the magazine itself and a switch means may merely be disposed adjacent to one side of the casing of the magazine, which can reduce the number of parts to a minimum and contribute to the desired miniaturization of tape recorders of the magazine type.

Other objects, features and advantages of the present invention will be apparent from the following detailed description taken in connection with the accompanying drawings.

DESCRIPTION OF THE PREFERRED EMBODIMENTS

Figure 1:
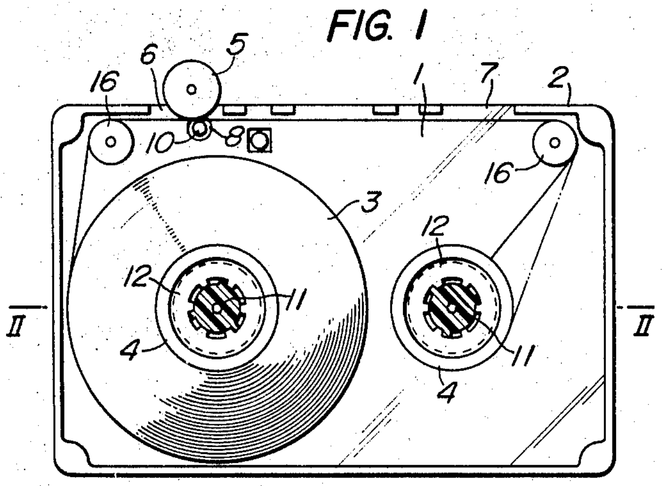
FIG. 1 is a cross-sectional view of a magazine employed in the present invention, the magazine being shown in its operating state.
Figure 2:
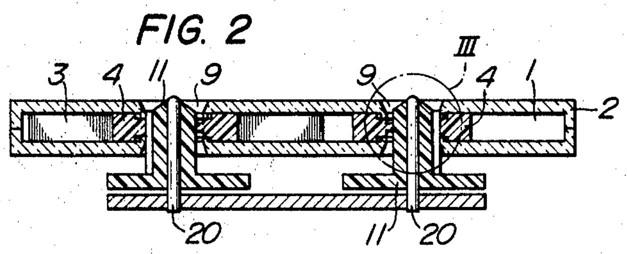
FIG. 2 is a sectional view taken along the line II–II in FIG. 1.

Referring first to FIGS. 1 to 4, an embodiment of the present invention will be described. In the present invention, a magazine 1 having a structure as shown in FIGS. 1 and 2 is employed. The magazine 1 comprises a casing 2 which consists of an upper section and a lower section detachably secured together which, when assembled, defines therebetween an internal space for housing a magnetic tape 3 and a pair of spaced rotatable hubs 4 therein. In one sidewall of the casing 2, there are recesses or openings 6 and 7 for receiving therein a pinch roller 5 and a magnetic head (not shown), respectively.

Figure 3:
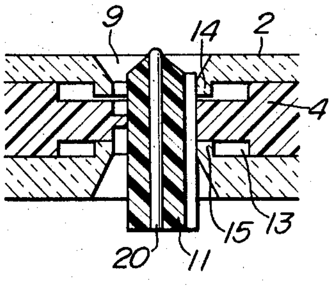
FIG. 3 is an enlarged detail view of the portion III in FIG. 2.

A through hole 8 and a pair of spaced through holes 9 extend vertically through the upper and lower walls of the casing 2 so as to receive therein a capstan 10 and a pair of reel tables 11, respectively. As shown in FIG. 3, circular recesses 12 and 13 are provided on the upper and lower surfaces of each hub 4, and a plurality of projections 14 and 15 extend inwardly from the peripheral edges of the hole 9 into the circular recesses 12 and 13, respectively. The diameter of the projections 14 and 15 extending inwardly from the peripheral edges of the hole 9 is smaller than the diameter of the circular recesses 12 and 13 in the hub 4 so that the hub 4 is horizontally movable or translatable by a distance corresponding to the difference between the respective diameters.

The magnetic tape 3 is securely fixed at opposite ends to a portion of the outer peripheral surfaces of the hubs 4 and is trained around the pair of hubs 4 by being guided by guide rollers 16 which are rotatably mounted on shafts disposed adjacent to two corners on the side of the sidewall of the casing 2 having the openings 6 and 7 therein. A switch means 17 for effecting the on-off control of current supply to a solenoid coil (not shown) which drives means for stopping the operation of the tape recorder is disposed adjacent to one end of the sidewall opposite to the sidewall of the casing 2 having therein the openings 6 and 7, and a contact 18 retractably protruding from the switch means 17 is normally engaged by the above-specified sidewall of the casing 2.

The tape drive control device operates in a manner as described below. Suppose now that the tape 3 is continuously fed from the right-hand hub 4 to the left-hand hub 4 by the capstan 10 and the pinch roller 5 until no layer of the tape 3 exists on the right-hand hub 4 and the trailing end portion of the tape 3 draws a line as shown by the two-dot chain line in FIG. 1. The tape 3 is further pulled from the above position until a position is reached in which the trailing end portion of the tape 3 lies on the line connecting the center of the right-hand hub 4 with the outer periphery of the right-hand guide roller 16, that is, on the line representing substantially the shortest distance between the hub 4 and the guide roller 16. Since the hubs 4 are movable over a slight distance relative to the casing 2 but the hubs 4 are unmovably engaged by the reel tables 11, a further pull imparted to the tape 3 causes a slight clockwise rotation of the casing 2 from the normal position shown by the lines PQRS to a position as shown by the dotted lines P'Q'R'S' in FIG. 4. The contact 18 is forced by the sidewall of the casing 2 into the switch means 17 thereby to urge the switch means 17 to its closed position. This actuates the means for stopping the operation of the tape recorder, which stops the rotation of the reel tables 11 with the result that no tension is imparted to the tape 3 and the tape 3 is placed in a completely stopped state.

Figure 5:
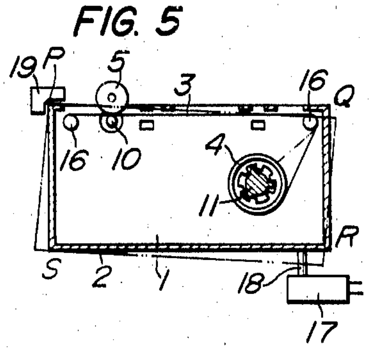
FIG. 5 is a schematic view showing the manner of operation of another embodiment of the tape drive control device according to the present invention.

Another embodiment of the present invention shown in FIG. 5 is generally similar to that described above except that a stopper 19 is provided adjacent to the point P on the casing 2 so that the casing 2 can rotate about the point P to a greater degree than in the case of the preceding embodiment. The greater amount of rotating movement of the casing 2 forces the contact 18 of the switch means 17 to move a correspondingly greater distance thereby to ensure the positive stop of the tape. Although the above embodiments have referred to the tape stopping means, it will be understood that any drive means such as tape reversing means may be driven to attain the purpose of the present invention.

Figure 6:
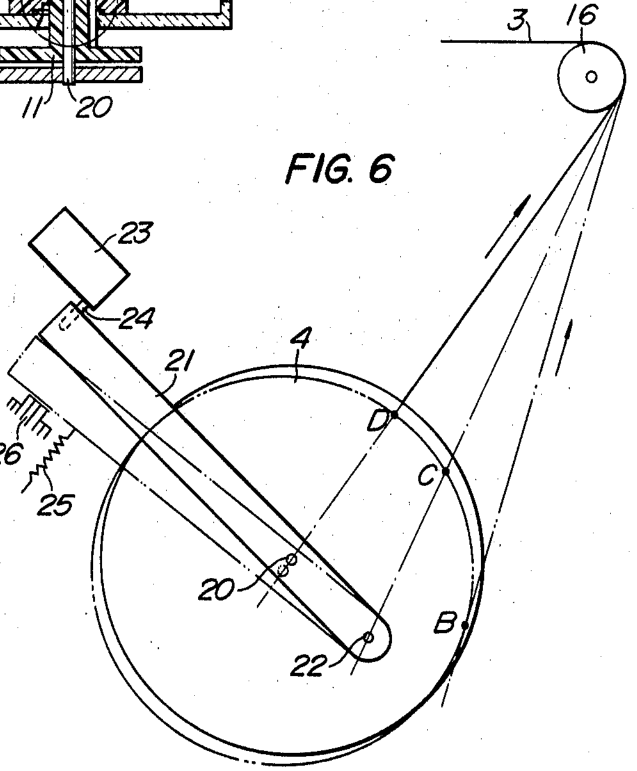
FIG. 6 is a schematic view showing the manner of operation of electrical contact actuating means in a further embodiment of the tape drive control device according to the present invention.
Figure 4:
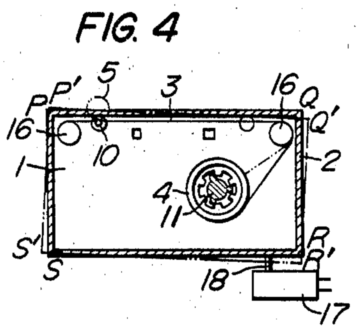
FIG. 4 is a schematic view showing the manner of operation of an embodiment of the tape drive control device according to the present invention.

A further embodiment of the present invention is provided with electrical contact actuating means as shown in FIG. 6. The reel table 11 is rotatably mounted on a reel table shaft 20, and the reel table shaft 20 is fixed at its lower end to a lever 21. The lever 21 is pivoted at one end thereof to the base plate (not shown) by a pivot pin 22, and thus the hub 4 drivingly engaged by the reel table 11 is swingable about the pivot pin 22. The other or free end of the lever 21 is engageable with a contact 24 of a switch means 23 which controls the current supply to a solenoid coil (not shown) associated with means for stopping the travelling movement of or reversing the travelling direction of the tape 3. A coil spring 25 is connected adjacent to the free end of the lever 21 so as to normally urge the lever 21 toward a stopper 26 during the travelling movement of the tape 3.

The lever 21 is disposed substantially perpendicularly with respect to the line connecting the center of the reel table shaft 20 with the outer peripheral surface of the guide roller 16, and the pivotal axis 22 of the lever 21 is disposed intermediate between the line connecting the center of the reel table shaft 20 with the outer peripheral surface of the guide roller 16 and the line tangential to both the outer peripheral surface of the guide roller 16 and the outer peripheral surface of the hub 4.

Suppose now that the tape 3 is continuously fed from the right-hand hub 4 to the left-hand hub 4 by the capstan 10 and the pinch roller 5 in FIG. 1 until no layer of the tape 3 exists on the right-hand hub 4 and the trailing end portion of the tape 3 draws a line, as shown by the thick two-dot chain line in FIG. 6, which is tangential to both the outer peripheral surface of the guide roller 16 and the outer peripheral surface of the right-hand hub 4 with the trailing end of the tape 3 positioned at a point B. As the tape 3 is further pulled, the hub 4 is rotated counterclockwise, and the trailing end of the tape 3 moves past a point C lying on the line connecting the center of the pivot pin 22 with the outer peripheral surface of the guide roller 16 to reach a point D lying on the line connecting the center of the reel table shaft 20 with the outer peripheral surface of the guide roller 16 as shown in FIG. 6. When the trailing end of the tape 3 comes to the point D, a large tension imparted to the tape 3 pulls the hub 4 toward the guide roller 16 with the result that the lever 21 makes a pivotal movement about the pivot pin 22 against the force of the biasing spring 25 and forces the contact 24 into the switch means 23 to actuate the latter, which therefore actuates the means for stopping the travelling movement of or reversing the travelling direction of the tape 3.

Although an application of the present invention to a tape recorder of the magazine type has been described here above by way of example, it will be understood that the present invention is also applicable to conventional tape recorders of the reel type by constructing the reel table thereof in a manner similar to the above.

In the last-mentioned embodiment of the present invention, the pivoting position of the lever 21 to the base plate may preferably be so selected as to lie between the outer periphery of the hub 4 and the center of the hub 4 as shown in FIG. 6. Disposition of the pivot point at such a position is quite effective in that the direction of the torque imparted to the lever 21 varies during the movement of the trailing end of the tape 3 from the point B to the point D depending on the position of the trailing end of the tape 3 relative to the pivotal axis 22 of the lever 21, which ensures a more positive movement of the lever 21 and hence a more positive actuation of the tape drive control means.

I claim:

1. In a tape recorder of the magazine type, a device for controlling the tape drive, comprising: a tape magazine having a casing, a pair of through holes in said casing to receive a pair of reel drive shafts with the peripheral edges of said holes being provided with circular projections extending inwardly therefrom, two hubs rotatably disposed in said through holes of said casing and provided with circular recesses on the upper and lower surface thereof to receive said projections, guide rollers securely fixed to said casing, a magnetic tape wound about said hubs through said guide rollers and secured at both ends to said hubs, openings provided in said casing through which said magnetic tape, moving from one of said hubs to the other, is engageable with a magnetic head, and holes to receive a capstan; and a switching means having a contact retractably protruding therefrom which is normally engaged by said casing; some play being provided between said hubs and said circular projections by virtue of the diameter of each of said circular projections being smaller than that of each of said circular recesses to allow relative movement between said hubs and said casing so that when the tape layers wound about one of said hubs have completely run out, said casing is slightly displaced to depress the contact of said switching means to actuate it under the action of the tension imparted to the tape between the hub and the nearer one of guide rollers securely fixed to said casing.

2. A device for controlling the tape drive according to claim 1, including a pair of reel drive shafts extending into said pair of through holes and immovably engaging said hubs, and in which the tension imparted to said tape as a result of the absence of any tape layers on said tape supply hub causes a rotary movement of said casing relative to said hub, and the rotary movement of said casing imparts the force to actuate said tape drive control means.

3. In a tape recorder of the magazine type, a device for controlling the tape drive comprising a tape magazine having a casing, two hubs rotatably disposed in said casing, guide rollers securely fixed to said casing, and a magnetic tape wound about said hubs through said guide rollers and secured at both ends to said hubs; means defining openings in said casing through which said magnetic tape, moving from one of said hubs to the other, is engageable with a magnetic head; means defining through holes to receive a capstan and means defining a pari of spaced through holes, the peripheral edges thereof being provided with projections extending inwardly therefrom, said holes being adapted to receive a pair of reel drive shafts, each of said hubs being provided with circular recesses on the upper and lower surface thereof to receive said projections, the diameter of said circular projections being made smaller than that of the circular recesses so that said hubs may have some play to be slightly movable relative to said casing; and tape drive control means adapted to be actuated by the tension imparted to said tape when the layers of said tape wound about one of said hubs have completely run out, and in which said tape drive control means comprises rotatable reel tables engaging the holes in said hubs for mounting said magazine thereon and a pivotal lever having the shaft of one of said reel tables fixedly supported thereon, so that the tension imparted to said tape causes a pivotal movement of said lever thereby to actuate said tape drive control means.

4. A device for controlling the tape drive according to claim 3, in which said lever is disposed substantially perpendicularly with respect to the line connecting the shaft of said reel table with the corresponding one of said guide rollers, and said lever is pivoted adjacent to one end thereof to the base plate by means of a pivot pin, said pivot pin pivotally supporting said lever being disposed between the line connecting the center of the shaft of said reel table with the outer peripheral surface of said guide roller and the line tangential to both the outer peripheral surface of said guide roller and the outer peripheral surface of said hub.